United States Patent Office 3,690,841
Patented Sept. 12, 1972

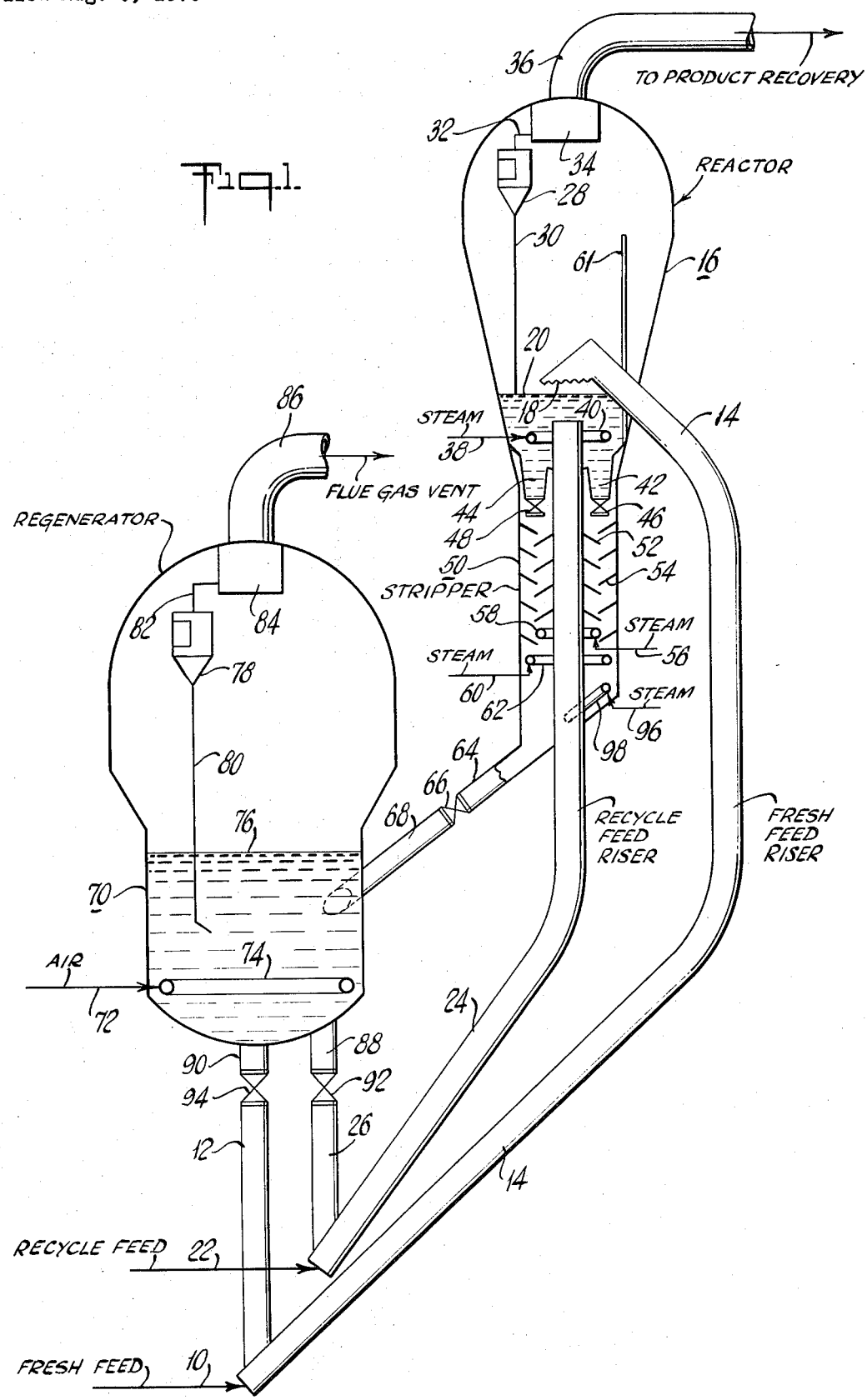

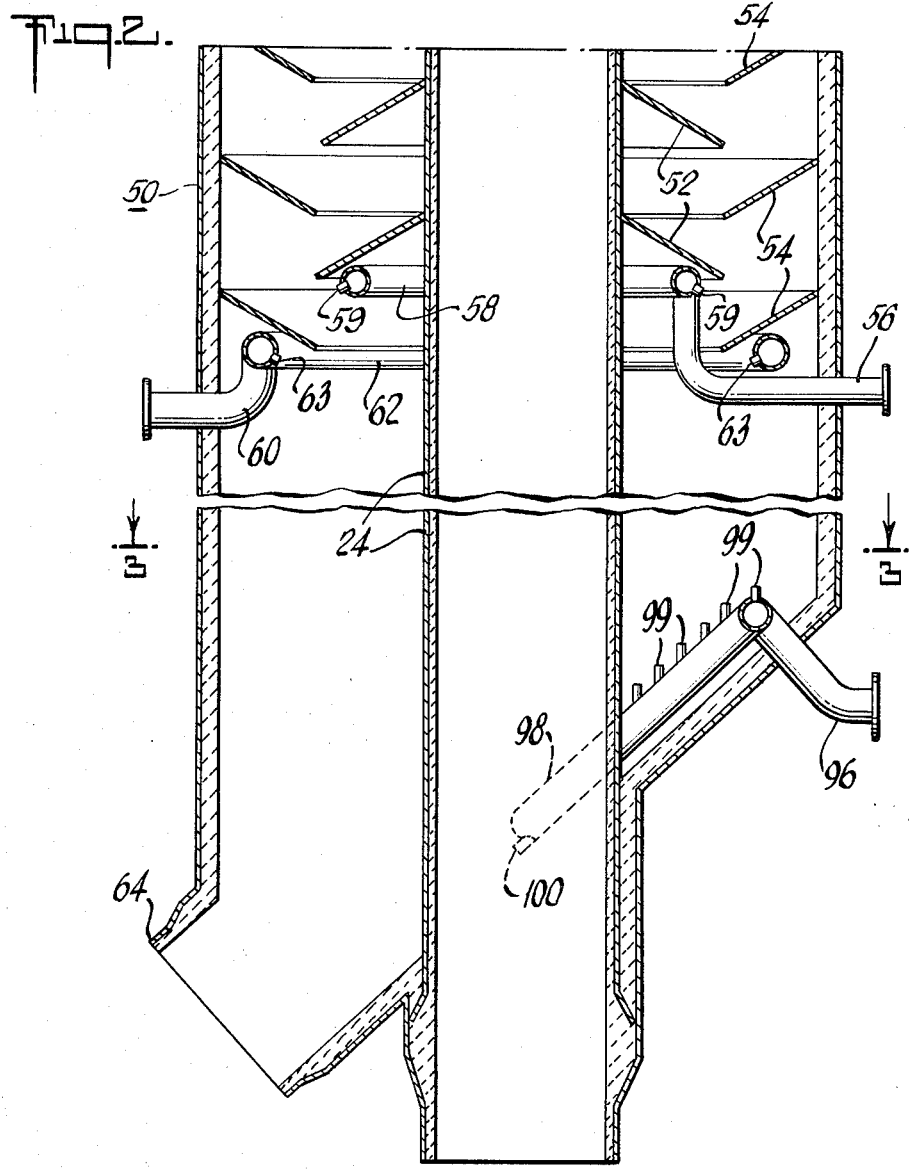
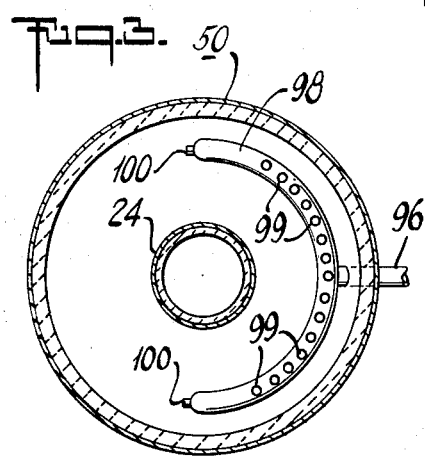
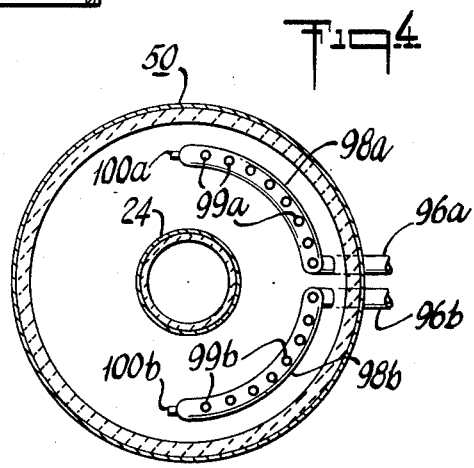

3,690,841
STEAM DISTRIBUTOR FOR FLUID CATALYTIC CRACKER STRIPPER
Dorrance P. Bunn, Jr., 5206 Grape Road, Houston, Tex. 77035, and Werner L. Hack, 20 Danzigerstr., 609 Russelsheim am Main, Germany
Filed Aug. 3, 1970, Ser. No. 60,585
Int. Cl. B01j 9/20
U.S. Cl. 23—288 S 3 Claims

ABSTRACT OF THE DISCLOSURE

A steam distributor is located in the conic discharge section of an annular catalyst stripper in a fluid catalytic cracker unit upstream of the recycle feed riser entry to provide for improved flow control of the discharge of the spent catalyst and the addtional stripping thereof.

BACKGROUND OF THE INVENTION

In the fluid catalytic cracking process, hydrocarbons are converted under conditions such that substantial portions of a hydrocarbon feed are transformed into desirable products, such as gasoline, alkylation feedstocks and middle distillate blending stocks and the like, with concomitant undesirable by-product formation. A particularly deleterious by-product is coke, which in the course of the hydrocarbon conversion reaction, is deposited upon the catalyst. When substantial amounts of coke deposition occur, reduction in catalyst activity and particularly catalyst selectivity results, thereby hindering hydrocarbon conversion, reducing gasoline production and simultaneously increasing the production of less desired products. To overcome such catalyst deactivation through coke deposition, the catalyst is normally withdrawn from the reaction zone and passed to a stripping zone wherein entrained and adsorbed hydrocarbons are displaced initially from the catalyst by means of a stripping medium, such as steam. The stripping medium and displaced hydrocarbons are removed and the stripped catalyst is passed to a regeneration zone, wherein it is contacted with an oxygen-containing gas, effecting combustion of at least a portion of the coke and regeneration of the catalyst. Thereafter, the regenerated catalyst is reintroduced to the reaction zone and therein contacted with additional hydrocarbon feed.

SUMMARY OF THE INVENTION

The invention provides for the installation of a steam distributor in the catalyst stripper, adjacent the recycle riser entry, upstream of the discharge therefrom into the spent catalyst standpipe, to cause the catalyst to flow in a constant uniform manner, as well as providing additional stripping.

Accordingly, it is an overall object of this invention to provide an improved stripper for use in a fluid catalytic cracking unit.

BRIEF DESCRIPTION OF THE DRAWINGS

FIG. 1 is a diagrammatic showing of a fluid catalytic cracking unit;
FIG. 2 is an enlarged view adjacent the discharge outlet of the stripper, showing the additional steam distributor;
FIG. 3 is a view taken along line 3—3 of FIG. 2; and
FIG. 4 is a plan view of an alternate construction of the additional steam distributor.

DESCRIPTION OF THE PREFERRED EMBODIMENT

With reference of FIG. 1 of the drawings, fresh hydrocarbon feed provided via line 10 is contacted with hot regenerated catalyst from standpipe 12, at a predetermined temperature, in the inlet portion of fresh feed riser 14. The resulting suspension of catalyst and hydrocarbon feed passes upwardly at a predetermined velocity into the reactor 16 and terminates in a downwardly directed outlet having a serrated edge 18, above dense bed level 20.

A recycle feed is introduced through line 22 into the inlet section of recycle feed riser 24, wherein it is contacted with hot catalyst from standpipe 26, the effluent being discharged into the lower portion of reactor 16.

Cracked products disengage from the catalyst above the dense phase bed level 20 and the vapors pass through cyclone 28 wherein entrained catalyst is separated and returned to the bed through dipleg 30. Although a single cyclone is shown for clarity, it will be understood that several cyclones may be assembled to achieve substantially complete separation, and a plurality of such assemblies may be employed to handle the volume of the vapors encountered. Effluent gases pass from cyclone 28 through line 32 to plenum chamber 34 wherein the gases from other cyclone assemblies (not shown) are collected and discharged from the reactor through line 36. Vapor line 36 conveys the cracked products to fractionation facilities (not shown), wherein the conversion products are recovered and separated into desired products and recycle streams, by compression, absorption and distillation facilities, as well known in the art.

Steam in line 38 is passed to steam ring or distributor 40 and discharges into the lower portion of reactor 16 at a point below the outlet of recycle riser 24. Dense phase catalyst in the lower portion of reactor 16 is stripped by steam from ring 40 and passes downwardly through standpipes 42 and 44 and valves 46 and 48 into the annular stripper 50. Stripper 50 is provided with baffles 52 attached to riser 24 and baffles 54 attached to the inside wall of stripper 50. Steam in line 56 is discharged through steam ring or distributor 58 into the lower portion of stripper 50 under the lowermost baffle 52 and through line 60 and steam ring or distributor 62 under the lowermost baffle 54. Steam rising through stripper 50 displaces and removes adsorbed and entrained hydrocarbon vapors which pass upwardly through stripper vent line 61 discharging into the upper portion of reactor 16.

Stripped cotalyst is withdrawn from the bottom of stripper 50 through spent catalyst standpipe 64 at a rate controlled by valve 66 and discharges through standpipe 68 into regenerator 70. In regenerator 70, the spent catalyst is contacted with air introduced through line 72 and air ring 74. Catalyst undergoing regeneration in regenerator 70 forms a dense bed having a top level 76. In regenerator 70, carbon on the surface of the catalyst is burned and the resulting flue gas passes upwardly and enters cyclone 78 wherein entrained catalyst is separated and returned to the regenerator dense bed through dipleg 80. Cyclone 78, although represented as a single vessel, of course, may comprise an assembly of cyclones arranged to effect substantially complete separation of entrained solids from the flue gas. Effluent flue gas from cyclone 78 is passed through line 82 into the plenum chamber 84 and outwardly through flue line 86 to vent facilities (not shown), which may include means to recover heat from the hot flue gas, means to utilize unconsumed carbon monoxide by the generation of additional heat, and means to recover energy by the generation of steam or by expansion through turbines with the generation of power, as is well known in the art. Regenerated catalyst is withdrawn from the bottom of the regenerator 70 through lines 88 and 90 at rates controlled by valves 92 and 94 to supply the hot regenerated catalyst to standpipes 26 and 12 as described previously.

Along the sloping conical bottom of stripper 50, an additional steam distributor 98 has been installed, steam being provided via the line 96. This distributor 98 may comprise a single semicircular ring, as shown in FIG. 3 or be comprised of a pair of quarter arc rings, as shown in FIG. 4, both structures extending around and to the center line of the recycle feed riser.

Referring to FIG. 2, which is an enlarged showing of the bottom of stripper 50, the positions of the baffles are seen clearly and that steam from distributor 58 is discharged from nozzles 59 downwardly and outwardly below and parallel to the lowermost baffle 52, and that steam from distributor 62 is discharged from nozzles 63 downwardly and inwardly below and parallel to the lowermost baffle 54. Steam distributor 98 has upwardly pointing nozzles 99, and a pair of downwardly pointing nozzles 100 (see FIG. 3) for drainage purposes which are aimed in the direction of the spent catalyst standpipe 64. The upwardly pointing nozzles provide additional stripping of the spent catalyst and by keeping the catalyst fluid, prevent any piling up on the upstream side of the recycle riser, and allows the spent catalyst to be discharged in a constant uniform manner. To prevent catalyst attrition and erosion of the discharge nozzles, the velocity of steam provided from the distributor 98 via the nozzles 99 should be in the range of from about 70 feet per second to about 180 feet per second.

FIG. 4 discloses an alternative structure to provide steam adjacent the recycle feed riser entry as comprising a pair of quarter arc rings 98a and 98b, which are provided with steam via the inlets 96a and 96b respectively, the steam being discharged through the nozzles 99a and 99b, and drained via the nozzles 100a and 100b.

Thus, there has been shown and described how an additional steam distributor can be located adjacent the discharge end of a fluid catalytic cracker stripper for improved flow performance of the spent catalyst therefrom.

Other modifications and variations of the invention as hereinbefore set forth may be made without departing from the spirit and scope thereof, and therefore only such limitations should be imposed as are indicated in the appended claims.

We claim:
1. In combination in an apparatus wherein a catalyst is recycled with appropriate dispensing of spent catalyst, a vertically extending spent catalyst stripper having an angled discharge structure at its lower end joined to a standpipe, a vertically extending recycle feed riser entering said stripper through said angled discharge structure baffles in the annulus defined by said stripper and said riser and supported thereby, and means for fluidizing said spent catalyst in said stripper located below the lowermost of said baffles comprising a pair of concentric steam providing rings, the inner ring having outwardly discharging nozzles, the outer ring having inwardly discharging nozzles, and being positioned below said inner ring, the improvement comprising means for providing fluid adjacent the entry of said riser at said angled discharge structure of said stripper comprising a semi-circular steam distributor partially surrounding said riser, and having upwardly pointing nozzles for additional stripping of spent catalyst and nozzles pointed downwardly substantially in the direction of the stripper discharge into said standpipe for drainage purposes.

2. In the combination as defined in claim 1, said apparatus comprising a fluid catalytic cracking unit, said upwardly pointing nozzles of said steam distributor being shaped to provide steam at a velocity in the range of from about 70 feet per second to about 180 feet per second to prevent catalyst attrition and erosion of said nozzles.

3. In the combination as defined in claim 1, said semi-circular steam distributor comprising a pair of quarter arc rings.

References Cited
UNITED STATES PATENTS

| | | | |
|---|---|---|---|
| 3,433,733 | 3/1969 | Bunn, Jr. et al. | 208—164 X |
| 749,206 | 1/1904 | Limbert | 302—24 |
| 3,001,931 | 9/1961 | Osborne | 23—288 S |

JAMES H. TAYMAN, JR., Primary Examiner

U.S. Cl. X.R.

23—1 F, 284; 208—164, 151; 302—53; 214—17 DA